United States Patent [19]

Seifert

[11] Patent Number: 4,527,913
[45] Date of Patent: Jul. 9, 1985

[54] GEAR SHIFT LEVER ASSEMBLY

[75] Inventor: Klaus Seifert, Wolfsburg, Fed. Rep. of Germany

[73] Assignee: Volkswagenwerk AG, Wolfsburg, Fed. Rep. of Germany

[21] Appl. No.: 475,765

[22] Filed: Mar. 16, 1983

[30] Foreign Application Priority Data

Mar. 20, 1982 [DE] Fed. Rep. of Germany ....... 3210319

[51] Int. Cl.³ .................... F16C 27/02; F16C 43/02
[52] U.S. Cl. .................................... 384/215; 384/440
[58] Field of Search .............. 74/473 R, 491; 248/49, 248/58, 65, 71, 74 R, 74 A, 74 B, 74 PB; 384/428, 435–444, 215, 217; 308/2 R, 236; 4/240, 237, 234; 24/457, 458

[56] References Cited

U.S. PATENT DOCUMENTS

| 2,547,317 | 4/1951 | Gustafson | 74/473 R |
| 3,042,461 | 7/1962 | Smith | 384/440 |
| 3,333,905 | 8/1967 | Hennequin | 384/440 |
| 3,563,615 | 2/1971 | Dobelin | 384/440 |
| 3,572,033 | 3/1971 | Tolley | 74/473 R X |
| 3,944,177 | 3/1976 | Yoda | 248/74 PB X |
| 4,358,165 | 11/1982 | Julius | 384/428 X |

FOREIGN PATENT DOCUMENTS

| 2734753 | 2/1979 | Fed. Rep. of Germany | 248/74.3 |
| 2256466 | 7/1975 | France | 74/473 R |
| 2483563 | 12/1981 | France | 248/74 A |
| 1087441 | 10/1967 | United Kingdom | 384/428 |
| 1594676 | 8/1981 | United Kingdom | 384/428 |

Primary Examiner—Stuart S. Levy
Assistant Examiner—Thomas R. Hannon
Attorney, Agent, or Firm—Spencer & Frank

[57] ABSTRACT

A gear shift lever assembly, particularly for an automatic vehicle transmission, has a gear shift lever; a pivot shaft affixed to the gear shift lever and at least one clip bearing mounted on a carrier and supporting the pivot shaft for angular displacement about the axis, whereby the gear shift lever is pivotal in a plane.

6 Claims, 4 Drawing Figures

U.S. Patent   Jul. 9, 1985   Sheet 1 of 2   4,527,913
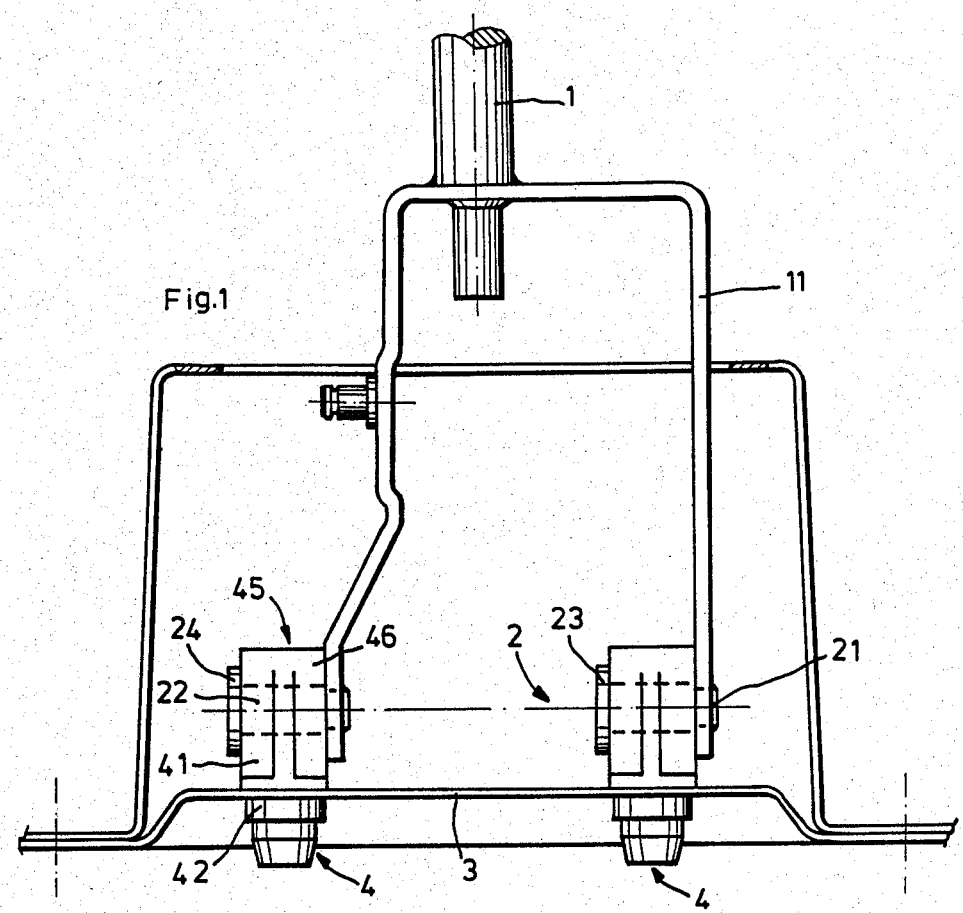
Fig.1
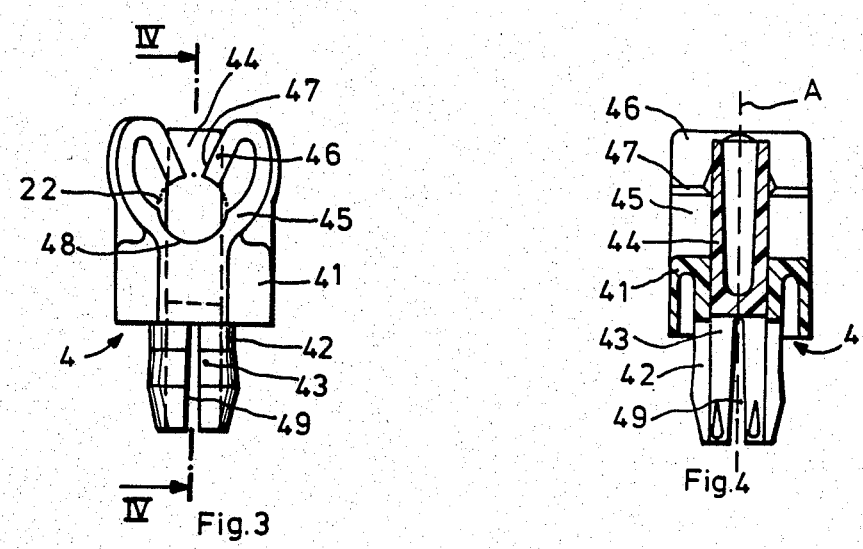
Fig.3
Fig.4

GEAR SHIFT LEVER ASSEMBLY

BACKGROUND OF THE INVENTION

This invention relates to a gear shift lever assembly, particularly adapted for use with automatic vehicle transmissions and is of the type which is articulated to a lever carrier and is pivotal about an axis in a single plane.

Conventionally, a gear shift lever for an automatic transmission is secured, by means of a bearing pin, with a screw connection or the like to a sheet metal bearing bracket or similar component which is mounted on the vehicle floor or a support console. Such a conventional mounting of the gear shift lever is relatively time-consuming and often involves difficulties because of a limited access.

SUMMARY OF THE INVENTION

It is an object of the invention to provide an improved gear shift lever assembly of the above-outlined type to ensure that while preserving the usual mode of operation there may be achieved, without additional expense, a particularly simple and rapid mounting of the gear shift lever at locations that are accessible only with relative difficulty.

This object and others to become apparent as the specification progresses, are accomplished by the invention, according to which, briefly stated, the gear shift lever is, by means of a bearing shaft affixed thereto, supported in at least one clip-on (push-in) bearing secured to a carrier member.

Thus, according to the invention, the gear shift levers are supported by clip-on bearings (hereafter clip bearings) which are components known by themselves and widely used, for example, to lay and secure conduits or cables. Advantageously, the attachment of the clip bearing to the carrier member such as the vehicle floor as well as the insertion of the bearing shaft of the gear shift lever into the clip bearing are carried out in a single mounting step.

BRIEF DESCRIPTION OF THE DRAWING

FIG. 1 is a front elevational view of a preferred embodiment of the invention.

FIG. 3 is a side elevational view of one component of the structure shown in FIGS. 1 and 2.

FIG. 4 is a sectional view taken along line IV—IV of FIG. 3.

DESCRIPTION OF THE PREFERRED EMBODIMENT

Figure 2:
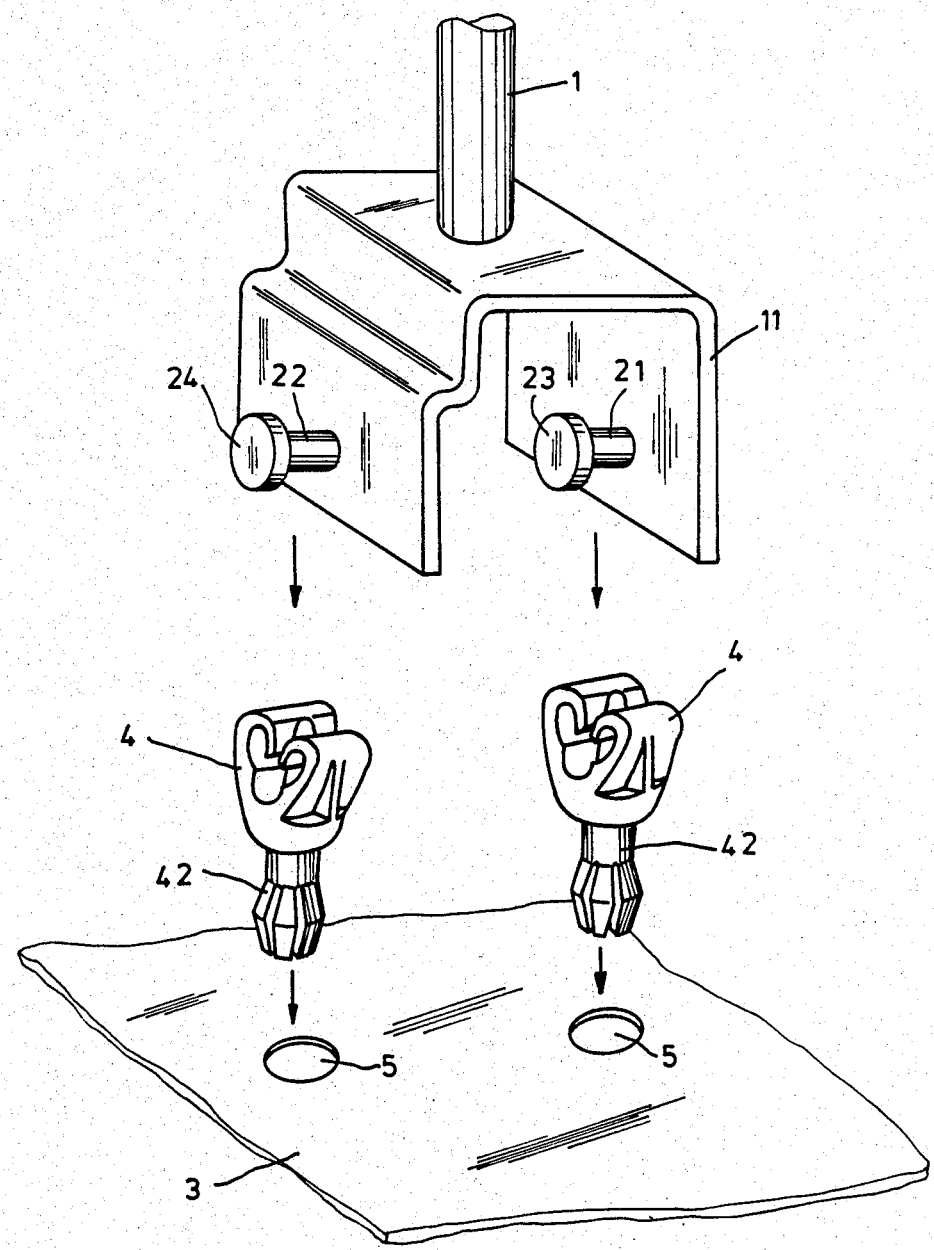
FIG. 2 is an exploded perspective view of the preferred embodiment depicting the components during mounting operation.

Turning now to FIGS. 1 and 2, a gear shift lever 1 (only its lower portion is shown) is articulated to a carrier base 3 by a bearing mechanism to be described in detail below, for a pivotal motion in a vertical plane about an axis 2. The carrier base 3 may be a part of a bearing console or bearing housing (transmission housing) arranged on the vehicle floor.

The lower end of the gear shift lever 1 oriented towards the carrier base 3 has a generally inverted U-shaped bracket 11, to the free ends of which bearing trunnions 21 and 22 are secured, for example, by welding. The trunnions 21 and 22 together form the pivot shaft of the gear shift lever 1.

The two bearing trunnions 21 and 22 are supported in two clip bearings (push-in bearings) 4 which are mounted on the carrier base 3 spaced from, and on either side of, the pivotal plane passing through the gear shift lever 1. In the embodiment illustrated, the two bearing trunnions 21 and 22 are both oriented in the same direction. The bearing trunnions 21 and 22 are provided at their left end (as viewed in FIG. 1) with a collar-like flange 23 and 24, respectively, so that a leftward axial displacement of the gear shift lever 1 is limited by the legs of the bracket 11, while a rightward axial displacement of the gear shift lever 1 is limited by the flanges 23 and 24 of the respective trunnions 21 and 22. It is to be understood that the bearing trunnions may be in principle arranged such that they face one another or are oriented back-to-back. In the latter cases collar-like flanges would not be essential because a limitation of axial displacement of the gear shift lever 1 in either direction would be provided by the legs of the U-shaped bracket 11. In principle, it is also feasible to provide a single throughgoing stationary bearing shaft. It is feasible, in particular cases, to support the gear shift lever 1 by means of only a single clip bearing on the carrier part. This could be the case, for example, if the gear shift lever is supported and guided laterally in a different manner and, in addition, it is ensured that an alignment of the bearing shaft necessary for a satisfactory operation is preserved. In general, however, the use of two clip bearings as shown in the illustrated embodiment is advantageous because, on the one hand, there is thus provided a sufficiently wide bearing base and, on the other hand, the occasionally very high vertical forces exerted on the gear shift lever during operation can be better absorbed.

FIGS. 3 and 4 illustrate the preferred configuration of the clip bearings 4. Each clip bearing 4 has a longitudinal axis A, a preferably rotationally symmetrical base portion 41, a tapered rotationally symmetrical axial stub or pin portion 42 which is radially expandable as well as a bearing part 45 for receiving a bearing shaft, such as bearing trunnions 22 and 23. The bearing part 45 is arranged at that portion of the base part 41 which is oriented away from the expandable pin 42. The bearing part 45 has a shaft-receiving opening 48 which has at least approximately a semi-cylindrical configuration as well as two mutually facing spring tongues 46 of at least approximately C-shaped configuration. The spring tongues 46 are designed and arranged in such a manner that while the bearing trunnion 22 or 23 can be pushed into the opening 48 whereby the spring tongues 46 are temporarily forced apart from one another, thereafter, however, the bearing trunnion can no longer be removed by an upward pull because the spring tongues 46 prevent such a displacement by virtue of their projecting ends 47 which engage the trunnion from above. In FIG. 3 it is shown in broken lines how the bearing trunnion 22 is arranged inside the bearing part 45 in the assembled state.

The mounting of the gear shift lever is effected in a simple manner by introducing the clip bearings 4, with their respective radially expandable (spreadable) axial pin portion 42, loosely into a respective receiving opening 5 of the carrier base 3. Thereafter, the bearing trunnions 21 and 22 of the pre-assembled gear shift lever 1 are pressed from above into the clip bearings 4, whereby not only the bearing trunnions 21 and 22 are received by the upper part of the clip bearings 4 but also, the clip bearings themselves, with their spreading fingers 42 are received and seated in the respective openings 5 of the carrier base 3. This operational step may be particularly well seen in FIG. 2.

The clip bearing 4 further has an axial bore 43 in which there is arranged a spreader pin 44 by means of which the axial pin part 42 is radially expanded upon pressing the spreader pin 44 deeper into the axial bore 43. In FIGS. 3 and 4 the spreader pin 44 is shown in its initial position, that is, prior to the radial spreading of the expanding pin part 42.

It is seen that the spreader pin 44 is, upon assembly, pressed downwardly by the bearing trunnions 21 and 22 as the latter are introduced into the upper part 45 of the clip bearing 4 and thus the axial pin part 42 is automatically radially expanded. As a result, the clip bearings 4 are firmly secured in the respective openings 5 of the carrier base 3.

It will be understood that, in principle, clip bearings other than that described may be used.

It will be understood that the above description of the present invention is susceptible to various modifications, changes and adaptations and the same are intended to be comprehended within the meaning and range of equivalents of the appended claims.

What is claimed is:

1. A gear shift lever assembly including a gear shift lever, a pivot shaft affixed to said gear shift lever and having a rotary axis and bearing means for supporting said pivot shaft; the improvement wherein said bearing means comprises at least one clip bearing mounted on a carrier and supporting said pivot shaft for angular displacement about said axis, whereby said gear shift lever is pivoted in a plane; said clip bearing including
   (a) a longitudinal axis;
   (b) a base part;
   (c) a radially expandable pin portion projecting axially from said base part and being of reduced circumference relative to said base part;
   (d) a bearing portion for receiving said pivot shaft; said bearing portion projecting axially from a side of said base part remote from said pin portion; and
   (e) two face-to-face oriented, approximately C-shaped spring tongues projecting from said bearing portion; said spring tongues together defining a clearance smaller than the diameter of said pivot shaft; said spring tongues being arranged for spreading apart upon forcing said pivot shaft thereon in a direction toward said bearing part, and said spring tongues extending over said pivot shaft when received by said bearing part; said spring tongues being arranged unyielding to forces applied by said pivot shaft when seated in said bearing part.

2. A gear shift lever assembly as defined in claim 1, wherein said at least one clip bearing is two in number, and further wherein the two clip bearings are situated spaced from, and on either side of, a pivotal plane passing through said gear shift lever.

3. A gear shift lever assembly as defined in claim 1, further comprising a generally U-shaped bracket affixed to an end of said gear shift lever, said pivot shaft being affixed to said bracket.

4. A gear shift lever assembly as defined in claim 3, wherein said bracket has two legs including free ends, and further wherein said pivot shaft comprises two trunnions affixed to said free ends.

5. A gear shift lever assembly as defined in claim 4, wherein each trunnion has a free end; further comprising a collar-like flange provided on said free end of each said trunnion.

6. A gear shift lever assembly as defined in claim 1, wherein said radially expandable pin portion has an axial passage opening into said bearing portion; further comprising a spreader pin slidably received in said passage and being engaged by said shaft when said shaft is received in said bearing portion, thereby said spreader pin is pressed axially in the direction of said expandable pin portion for radially spreading said expandable pin portion.

* * * * *